United States Patent [19]
Mizuta et al.

[11] Patent Number: 5,488,324
[45] Date of Patent: Jan. 30, 1996

[54] DETECTION CIRCUIT FOR DETECTING A STATE OF A CONTROL SYSTEM WITH IMPROVED ACCURACY

[75] Inventors: Satoru Mizuta; Katsuya Shimizu, both of Kasugai, Japan

[73] Assignees: Fujitsu Limited, Kawasaki; Fujitsu VLSI Limited, Kasugai, both of Japan

[21] Appl. No.: 300,939

[22] Filed: Sep. 6, 1994

Related U.S. Application Data

[63] Continuation of Ser. No. 880,026, May 8, 1992, abandoned.

[30] Foreign Application Priority Data

May 8, 1991 [JP] Japan .................................. 3-102874

[51] Int. Cl.⁶ ...................................................... H03K 19/08
[52] U.S. Cl. .............................. 327/77; 327/319; 327/327
[58] Field of Search ................................... 307/350, 355, 307/360, 362; 328/146, 147, 150

[56] References Cited

U.S. PATENT DOCUMENTS

| | | | |
|---|---|---|---|
| 4,147,940 | 4/1979 | Beydler et al. | 307/362 |
| 4,244,050 | 1/1981 | Weber et al. | 371/66 |
| 4,672,238 | 6/1987 | Nemoto | 307/350 |
| 4,845,379 | 7/1989 | Carlsten | 328/146 |
| 5,120,995 | 6/1992 | Abdi | 307/351 |
| 5,166,549 | 11/1992 | DeDoncker | 307/362 |

FOREIGN PATENT DOCUMENTS

| | | |
|---|---|---|
| 0295497 | 12/1988 | European Pat. Off. . |
| 2139031 | 10/1984 | United Kingdom . |
| 2206983 | 1/1989 | United Kingdom . |

OTHER PUBLICATIONS

*Patent Abstracts of Japan*, vol. 7, No. 140 (E–182), Jun. 18, 1983 & JP–A–58 054662 (Fujitsu K.K.) Mar. 31, 1983.

*Primary Examiner*—Peter S. Wong
*Assistant Examiner*—Shawn Riley
*Attorney, Agent, or Firm*—Staas & Halsey

[57] ABSTRACT

In a detection circuit, a voltage-conversion circuit is supplied with a first voltage signal indicative of the state of an object circuit and produces an output current in response thereto, a detection circuit is supplied with a second voltage signal and detects the state of the object circuit in response thereto, and a clamping circuit, having an input terminal, is supplied at the input terminal thereof with the output current of the voltage-current conversion circuit and clamps the voltage at the input terminal thereof, and thus the output voltage of the voltage-current conversion circuit, at a predetermined level. The clamping circuit further produces the second voltage signal, which is supplied to the detection circuit, in response to the output current of the voltage-current conversion circuit and such that the second voltage signal has a magnitude proportional to the first voltage signal.

9 Claims, 12 Drawing Sheets

DETECTION CIRCUIT FOR DETECTING A STATE OF A CONTROL SYSTEM WITH IMPROVED ACCURACY

This application is a continuation, of application Ser. No. 07/880,026, filed May 8, 1992, now abandoned.

BACKGROUND OF THE INVENTION

The present invention generally relates to control systems, and more particularly to a detection circuit used in a control system for detecting a state of an object that is under control.

Microcomputers are used in various control systems for detecting the state of an object that is under control and for controlling the same based upon the information about the state thus detected. In the driver circuits of actuation devices such as electric motors or magnetic relays, for example, the state of the actuation device is detected by a detection circuit, and the output of the detection circuit indicative of the state of the actuation device is sent to a microcomputer for subsequent control.

Generally, the detection circuit is driven by a supply voltage that is different from the supply voltage that powers the actuation devices. For example, actuation devices are powered by a supply voltage of 12 volts or 24 volts in the automotive applications, while the detection circuit is usually powered by a supply voltage of 5 volts. Thereby, there frequently occurs a case wherein the detection circuit has to detect a voltage that exceeds the detection circuit supply voltage.

In order to guarantee a normal operation of the detection circuit, the detection circuit usually uses a voltage divider for reducing the voltage that is to be detected. On the other hand, the use of the voltage divider raises a problem of reduced sensitivity of the detection circuit, as the variation of the voltage to be detected is demagnified by the use of the voltage divider. Thereby, the detection circuit tends to be vulnerable to noises and the risk of an erroneous operation of the detection circuit increases.

Figure 1:
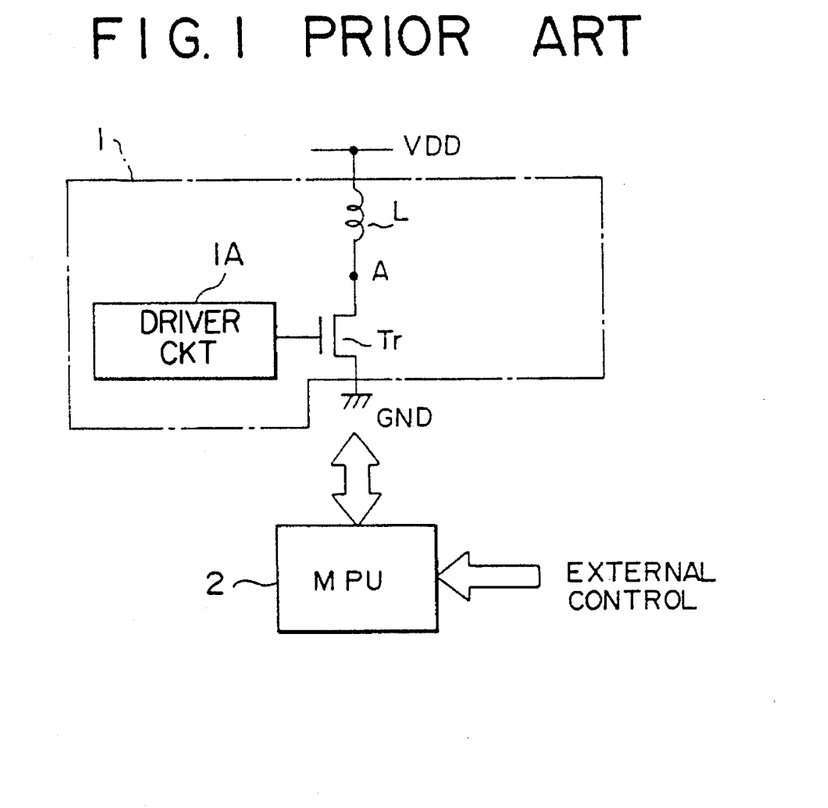
FIG. 1 is a circuit diagram showing the construction of a conventional control system that includes a solenoid and a microcomputer for controlling the solenoid via a drive circuit.

FIG. 1 shows an example of a control system that controls an actuation device by a microcomputer.

Referring to FIG. 1, the actuation device includes a solenoid L powered by a supply voltage $V_{DD}$ at a power supply line and a drive circuit $1_A$ that drives the solenoid L via a MOS transistor Tr, which in turn is connected in series to the solenoid L between the power supply line and the ground. The solenoid L may be used for actuating a mechanical device such as a brake of an automobile. Thereby, the solenoid L, the MOS transistor Tr, and the drive circuit $1_A$ form a system 1 that is subjected to control, and there is provided a microcomputer (MPV) 2 for controlling the system 1. There, the microcomputer 2 monitors the state of the system 1 such as the state of the solenoid L and controls the same in response to the monitored state of the system 1, based upon an external control signal supplied to the microcomputer 2. In order to monitor the state, a detection circuit to be described below is used.

Figure 2:
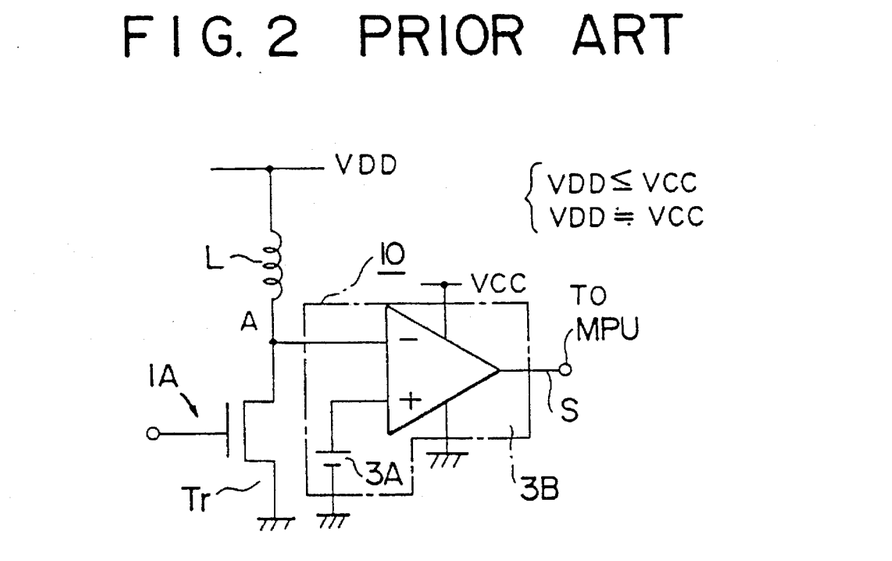
FIG. 2 is a circuit diagram showing the construction of a conventional detection circuit applicable to the control system of FIG. 1 for monitoring the state of the solenoid.

FIG. 2 shows the construction of a most fundamental detection circuit 10 that is used in the system 1 of FIG. 1.

Referring to FIG. 2, the detection circuit 10 includes a comparator $3_B$ having an inverting input terminal connected to a node A, where the solenoid L and the transistor Tr are connected in series, and a non-inverting input terminal connected to a reference voltage source $3_A$. There, the comparator $3_B$ is activated by a supply voltage $V_{CC}$ and produces an output voltage S when the voltage level at the node A has decreased below the reference voltage. This output voltage S is supplied to the microprocessor 2 of FIG. 1. The microprocessor 2, in turn, supplies a control voltage to a gate of the MOS transistor Tr that forms the drive circuit $1_A$.

It should be noted that the detection circuit 10 of FIG. 2 operates only when the supply voltage $V_{DD}$ is approximately equal to or lower than the supply voltage $V_{CC}$. When the voltage $V_{DD}$ exceeds the voltage $V_{CC}$, there occurs a case wherein a voltage at the node A exceeds the supply voltage $V_{CC}$. In such a case, the comparator $3_B$ and hence the detection circuit 10 no longer operates properly.

Figure 3:
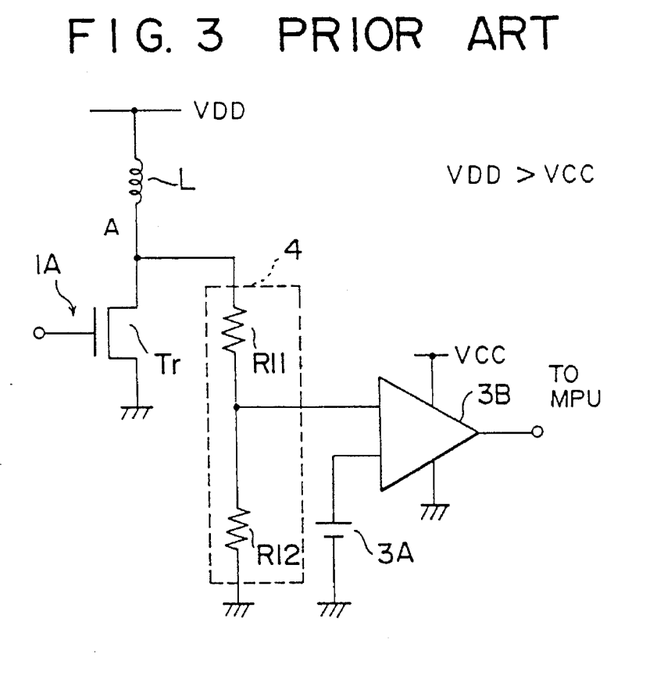
FIG. 3 is a circuit diagram showing the construction of another conventional detection circuit applicable to the control system of FIG. 1 for monitoring the state of the solenoid.

In order to overcome this problem and to provide a detection circuit that can operate in a wide voltage range, a detection circuit shown in FIG. 3 is proposed, wherein the circuit includes a voltage divider 4 that in turn includes a first resistor $R_{11}$ and a second resistor $R_{12}$ that are connected in series. Thereby, the voltage at the node A is voltage-divided by the resistors $R_{11}$ and $R_{12}$ to a level that does not exceed the supply voltage $V_{CC}$ of the comparator $3_B$. Thereby, the circuit of FIG. 3 can operate properly even when the voltage level of the supply voltage $V_{DD}$ exceeds the voltage level of the supply voltage $V_{CC}$.

Figure 4:
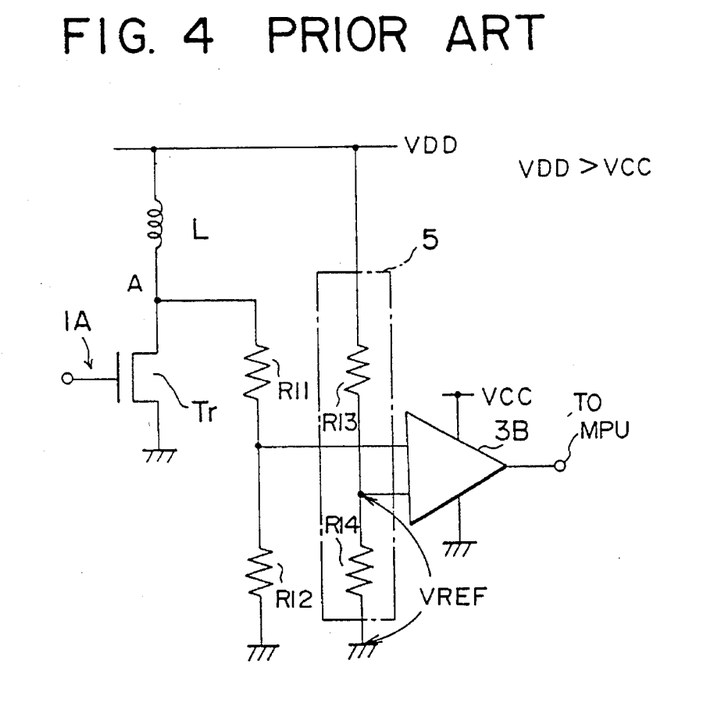
FIG. 4 is a circuit diagram showing the construction of still another conventional detection circuit that is applicable to the control system of FIG. 1 for monitoring the state of the solenoid.

FIG. 4 shows another conventional example of a detection circuit for use in the control system of FIG. 1, wherein there is provided another voltage divider 5 for producing a reference voltage for the comparator $3_B$ from the supply voltage $V_{DD}$.

Referring to FIG. 4, the voltage divider 5 includes first and second resistors $R_{13}$ and $R_{14}$ that are connected in series between the voltage supply line carrying the supply voltage $V_{DD}$ and the ground. Thereby, a reference voltage $V_{REF}$ is produced across the resistor $R_{14}$ by the voltage-dividing of the supply voltage $V_{DD}$, and the comparator $3_B$ becomes immune to any voltage variation in the supply voltage $V_{DD}$. In each of the circuits of FIG. 3 and FIG. 4, the operation of the comparator $3_B$ is held normal even when the supply voltage $V_{DD}$ exceeds the supply voltage $V_{CC}$. Thereby, the circuit is suitable for use in the car-borne or other vehicle-carried control systems.

In the detection circuit of FIG. 3 or FIG. 4, it should be noted that the variation of the voltage at the node A is demagnified as a result of the voltage-dividing. In other words, the extent of variation of the voltage at the node A is reduced when the voltage variation is detected by the comparator $3_B$. On the other hand, the sensitivity of the comparator $3_B$ remains the same. Thereby, there occurs a problem in that the S/N ratio of the detection circuit is poor and the control system 1 is vulnerable to the noises that are superposed on the supply voltage $V_{DD}$. It should be noted that the detection circuit should be able to detect any deviation of the voltage at the node A from a predetermined, designed level. This is particularly important when detecting the anomaly that may be caused by a leak of the current in the solenoid. When such an anomaly is overlooked, for example in the brake control system or other essential control systems of vehicles, a disastrous event may be caused.

SUMMARY OF THE INVENTION

Accordingly, it is a general object of the present invention to provide a novel and useful detection circuit wherein the foregoing problems are eliminated.

Another and more specific object of the present invention is to provide a detection circuit for use in a control system for detecting the state of an actuation device with an increased operational range and an improved accuracy.

Another object of the present invention is to provide a detection circuit for detecting a state of an object circuit, comprising voltage-current conversion means supplied with a first voltage signal indicative of the state of said object circuit for producing an output current having a magnitude indicative of said state in response to said first voltage signal; detection means activated by a supply-voltage, said detection means being supplied with a second voltage signal for detecting said state of said object circuit in response thereto; clamping means having an input terminal to which said output current of said voltage-current conversion means is supplied, said clamping means clamping a voltage of said input terminal at a predetermined level, said clamping means producing said second voltage signal in response to said output current such that said second voltage has a magnitude proportional to said first voltage signal and such that said magnitude of said second voltage signal is smaller than said supply voltage, said clamping means supplying said second voltage signal to said detection means. According to the present invention, the state of the actuation device, which is driven by the first supply voltage, can be detected by the comparator that is driven by the second supply voltage that may be lower than the first supply voltage, without sacrificing the accuracy of detection. It should be noted that the detection circuit of the present invention does not use the voltage divider that inevitably causes a reduction in the accuracy of detection. Thereby, the state of the control system is detected by a controller or a computer with improved accuracy and simultaneously with an improved reliability. Thus, the detection circuit of the present invention is suitable for use in the control systems the malfunctioning of which may cause a disastrous effect, such as the vehicle control systems.

Other objects and further features of the present invention will become apparent from the following detailed description when read in conjunction with the attached drawings.

DETAILED DESCRIPTION OF THE PREFERRED EMBODIMENTS

First, the principle of the present invention will be explained with reference to FIGS. 5(A) and 5(B) as well as FIGS. 6(A)–6(D).

Figure 5A:
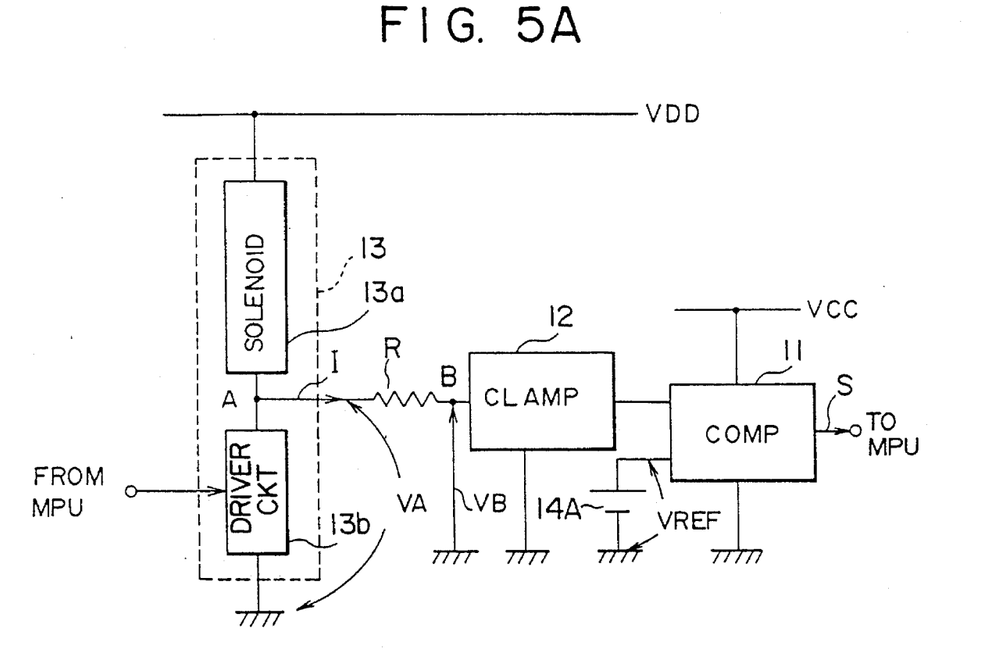
FIG. 5(A) is a block diagram showing the principle of the present invention.

Referring to FIG. 5(A) showing the fundamental construction of the control system that is controlled by a microcomputer MPU, the system includes an actuation circuit 13 that in turn includes an actuation device 13a such as a solenoid and a driver circuit 13b that drives the actuation device 13a. There, the driver circuit 13b is supplied with a control signal from the microcomputer MPU and activates the solenoid 13a. In response to the activation of the solenoid 13a, the voltage level at a node A inside the circuit 13 changes. Thus, the voltage level of the node A, represented as $V_A$, indicates the operational state of the actuation device. Further, by monitoring the deviation of the voltage level at the node A, one can detect any anomaly of the actuation device. It should be noted that the actuation circuit 13 and hence the actuation device 13a is driven by a first supply voltage $V_{DD}$.

To the node A, an end of a resistor R is connected such that a current I flows through the resistor R in response to the voltage $V_A$. The resistor R has another end connected to a voltage clamp circuit 12 that clamps the voltage at a node B, which corresponds to the aforementioned another end, at a voltage level $V_B$. Thereby, the clamp circuit 12 produces an output voltage corresponding to the current I and supplies the same to a comparator 11 that is driven by a second supply voltage $V_{CC}$. There, the comparator 11 compares the output voltage of the circuit 12 with a predetermined, reference voltage $V_{REF}$ and produces an output signal S indicative of the result of the comparison. The comparator 11 supplies the output signal S to the microcomputer MPU.

Figure 5B:
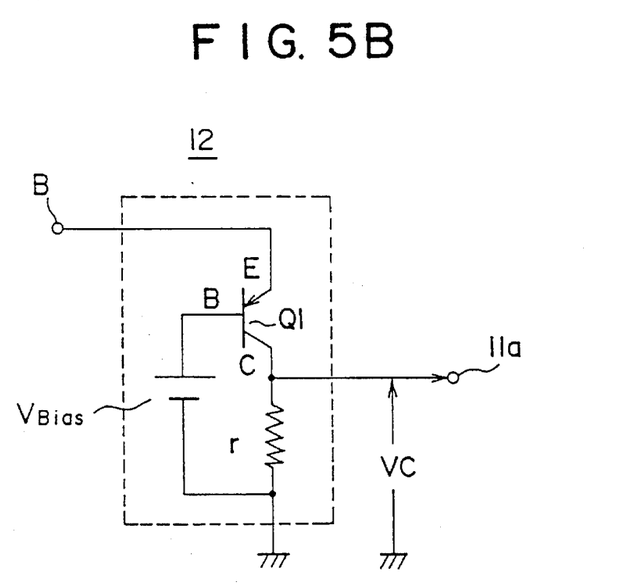
FIG. 5(B) is a circuit diagram showing an essential part of the detection circuit of FIG. 5(A)

FIG. 5(B) shows the construction of the clamp circuit 12.

Referring to FIG. 5(B), the clamp circuit 12 includes a bipolar transistor $Q_1$ having an emitter connected to the node B. Further, the transistor $Q_1$ has a base supplied with a predetermined bias voltage $V_{Bias}$, and a collector that is connected to the ground via a resistor r. Thereby, a voltage $V_C$ appearing across the resistor r is supplied to the comparator 11 via an output terminal $11_a$.

Next, the operation of the circuit of FIG. 5(A) will be described in detail.

Figure 6A:
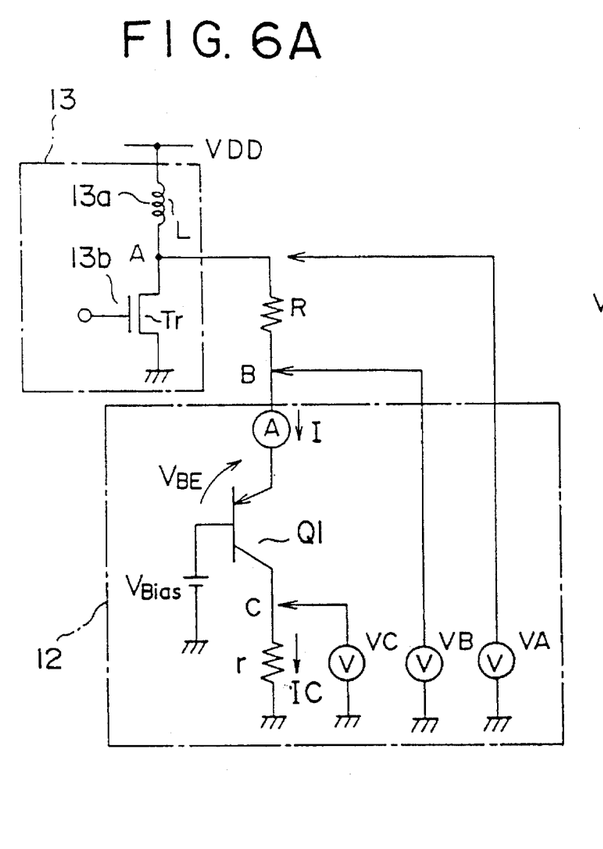
FIGS. 6(A)–6(D) are diagrams for explaining the principle of operation of the detection circuit according to the first embodiment of the present invention.

Referring to FIG. 6(A) showing a part of the circuit of FIG. 5(A) excluding the comparator 11, it will be seen that the actuation circuit 13a comprises a solenoid L while the drive circuit 13b comprises a MOS transistor Tr that is connected in series to the solenoid L. The transistor Tr is supplied with a control signal at a gate thereof, and a current flows from the supply voltage line carrying the first supply voltage $V_{DD}$ to the ground upon the turning-on of the transistor Tr. In response to the turning-on of the transistor Tr, the level of the voltage at the node A decreases, while when the transistor Tr is turned off, the node A assumes a high voltage level substantially equal to the supply voltage $V_{DD}$. On the other hand, when the transistor Tr is defective and a leak current flows through the transistor Tr, the voltage level of the node A deviates from the designed voltage level.

Figure 6B:
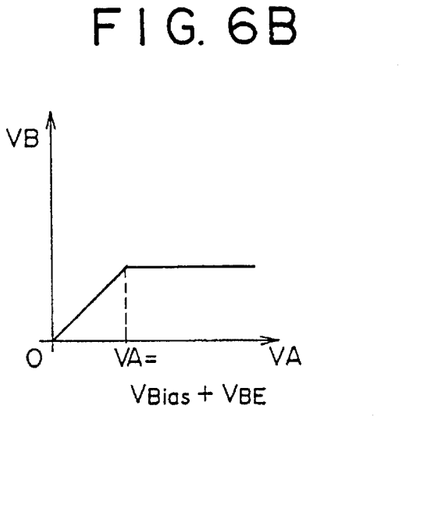

In the circuit of FIG. 6(A), the voltage $V_A$ at the node A is converted to the current I that flows through the resistor R, and the current I is supplied to the emitter of the transistor $Q_1$ that forms the clamp circuit 12. As the base of the transistor $Q_1$ is biased at the fixed voltage $V_{Bias}$, the voltage level $V_B$ at the node B, corresponding to the emitter voltage of the transistor $Q_1$, increases linearly with the voltage $V_A$ as shown in FIG. 6(B) as long as the transistor Tr is not turned on and the current I is zero.

When the voltage $V_A$ exceeds the sum of the bias voltage $V_{Bias}$ and the base-emitter voltage $V_{BE}$, on the other hand, the transistor $Q_1$ turns on and the current I starts to flow through the transistor $Q_1$ from the emitter to the collector with a magnitude given as $I=(V_A-V_B)/R$. Thereby, the voltage $V_B$ at the node B is clamped at the foregoing level of $V_{Bias}+V_{BE}$. See FIG. 6(B).

Figure 6C:
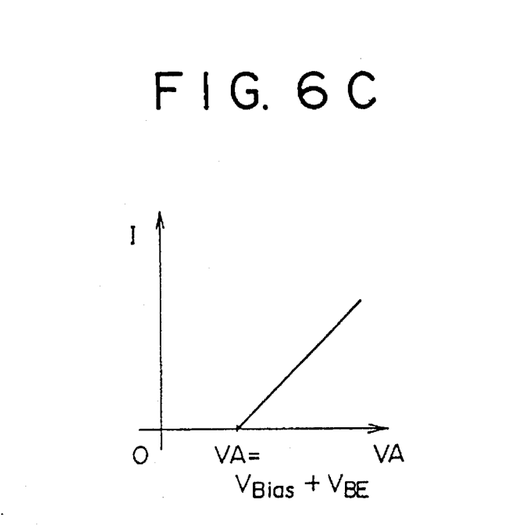
Figure 6D:
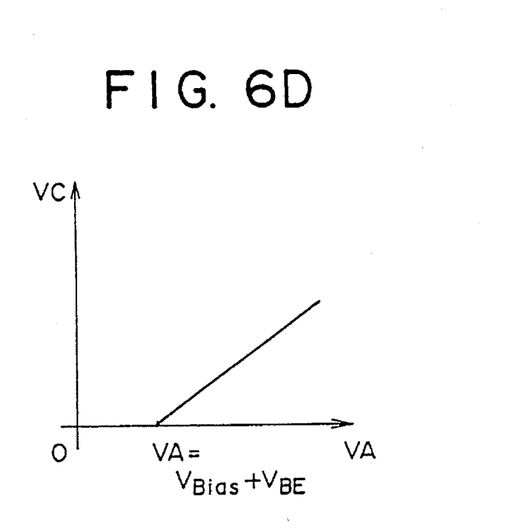

Once the transistor $Q_1$ is turned on, on the other hand, the current I that flows through the transistor $Q_1$ increases with increasing voltage $V_A$ as shown in FIG. 6(C). Thereby, there is formed the voltage $V_C$ across the resistor r in correspondence to a collector current $I_C$ such that the voltage $V_C$ changes in a one-to-one relationship with the voltage $V_A$. As is well known, the collector current $I_C$ is given as $I_C=(1-1/H_{FE}) \cdot I$, wherein $H_{FE}$ represents the common emitter current gain as usual. When the common emitter current gain $H_{FE}$ is sufficiently large, one can approximate the current I as $I \approx I_C$.

It should be noted that the voltage $V_C$ is substantially smaller than the voltage $V_A$. By suitably choosing the value of the resistor r at the collector of the transistor $Q_1$, it is possible to set the voltage $V_C$ below the supply voltage $V_{CC}$ that activates the comparator 11. It should be noted that the voltage $V_C$ is given as $$V_C = I_C \times r$$
$$= [V_A - (V_{BE} + V_{Bias})]/R \times r$$
$$= (r/R) \times V_A - K,$$

where K is a constant and given as $$K=(r/R)\times(V_{BE}+V_{Bias}).$$

As the input voltage $V_C$ does not exceed the supply voltage $V_{CC}$ of the comparator 11 when the parameter K is set appropriately, the normal operation of the comparator 11 is guaranteed. Further, the conversion of the voltage from the first voltage $V_A$ to the second voltage $V_C$ is achieved without using a voltage divider. In other words, there is no sacrifice in the accuracy of the voltage detection during the conversion of the voltage $V_A$ to the voltage $V_C$.

Figure 7:
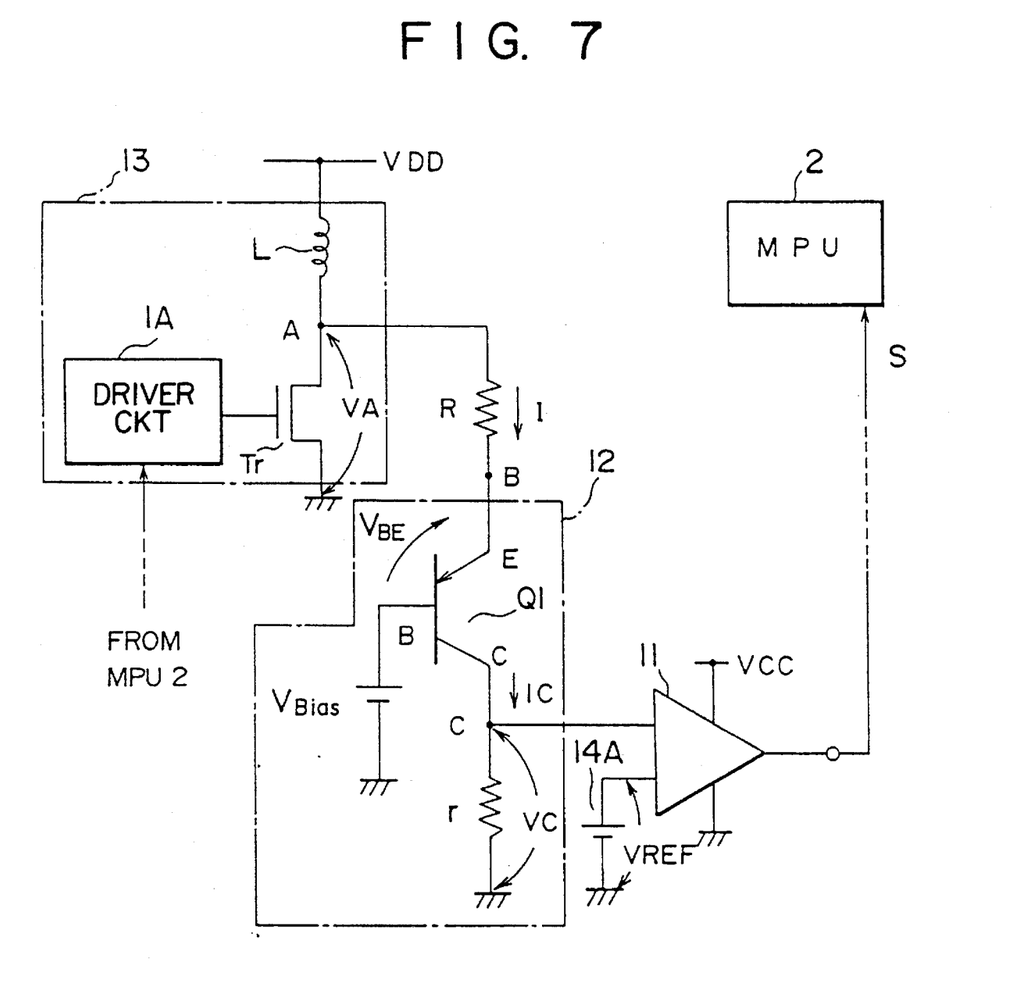
FIG. 7 is a circuit diagram showing the construction of the detection circuit according to a first embodiment of the present invention.

FIG. 7 shows a first embodiment of the present invention.

Referring to FIG. 7, the circuit 13 includes, in addition to the solenoid L and the MOS transistor Tr, a control circuit $1_A$ for controlling the transistor Tr in response to the output from a microcomputer 2. Thereby, the circuit $1_A$ forms a part of the driver circuit 13b together with the MOS transistor Tr. The clamp circuit 12 has a construction substantially as described with reference to FIG. 6(A) and produces the output voltage $V_C$ at the collector of the transistor $Q_1$. The output of the clamp circuit 12 is supplied to the comparator 11 that produces the output signal S in response to the result of comparison, and the comparator 11 supplies the output signal S to the microcomputer 2.

In the embodiment of FIG. 7, the supply voltage $V_{DD}$ for driving the solenoid L may be set to 30 volts, while the supply voltage $V_{CC}$ for driving the comparator 11 is set to 5 volts. Further, the resistors R and r are set such that the voltage $V_B$ does not exceed the supply voltage $V_{CC}$ as already mentioned. Thereby, the comparator 11 operates without problem in spite of the use of the supply voltage $V_{DD}$ that substantially exceeds the supply voltage $V_{CC}$. Thereby, the state of the actuation device, such as the solenoid L used for the motor, relay or actuator, can be monitored by the microcomputer 2 with an improved precision that is given by the coefficient r/R.

Figure 8:
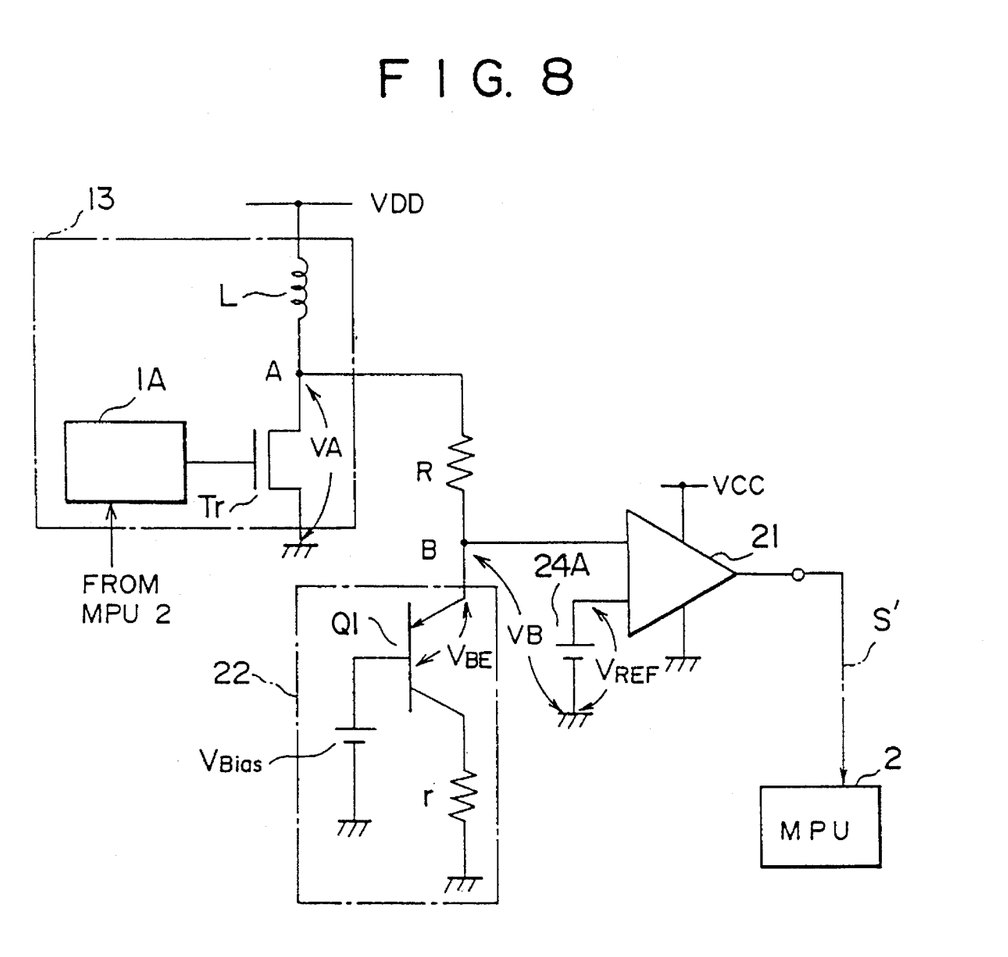
FIG. 8 is a circuit diagram showing the construction of the detection circuit according to a second embodiment of the present invention.

FIG. 8 shows a second embodiment of the present invention.

Referring to FIG. 8, the detection circuit of the present invention has a construction substantially identical with the circuit of FIG. 7, except that the voltage $V_B$ at the node B is supplied directly to a comparator 21 that is driven by the second supply voltage $V_{CC}$. There, the comparator 21 is supplied with a reference voltage $V_{REF}$ from a reference voltage source $24_A$ and produces an output signal S' in response to the result of the comparison. The output signal S' is supplied further to the microcomputer 2.

In the present embodiment, it is possible to monitor the voltage $V_A$ even when the voltage $V_A$ is in the range below the voltage $V_B=(V_{Bias}+V_{BG})$. It should be noted that, in the circuit of FIG. 7, the transistor $Q_1$ is turned off in this range of the voltage $V_A$ and no output voltage $V_C$ appears. See FIG. 6(D). On the other hand, when the voltage $V_A$ has exceeded the voltage $V_B$, the operation of the comparator 21 becomes no longer valid, and the circuit of FIG. 8 does not provide a correct result to the microcomputer 2.

Figure 9:
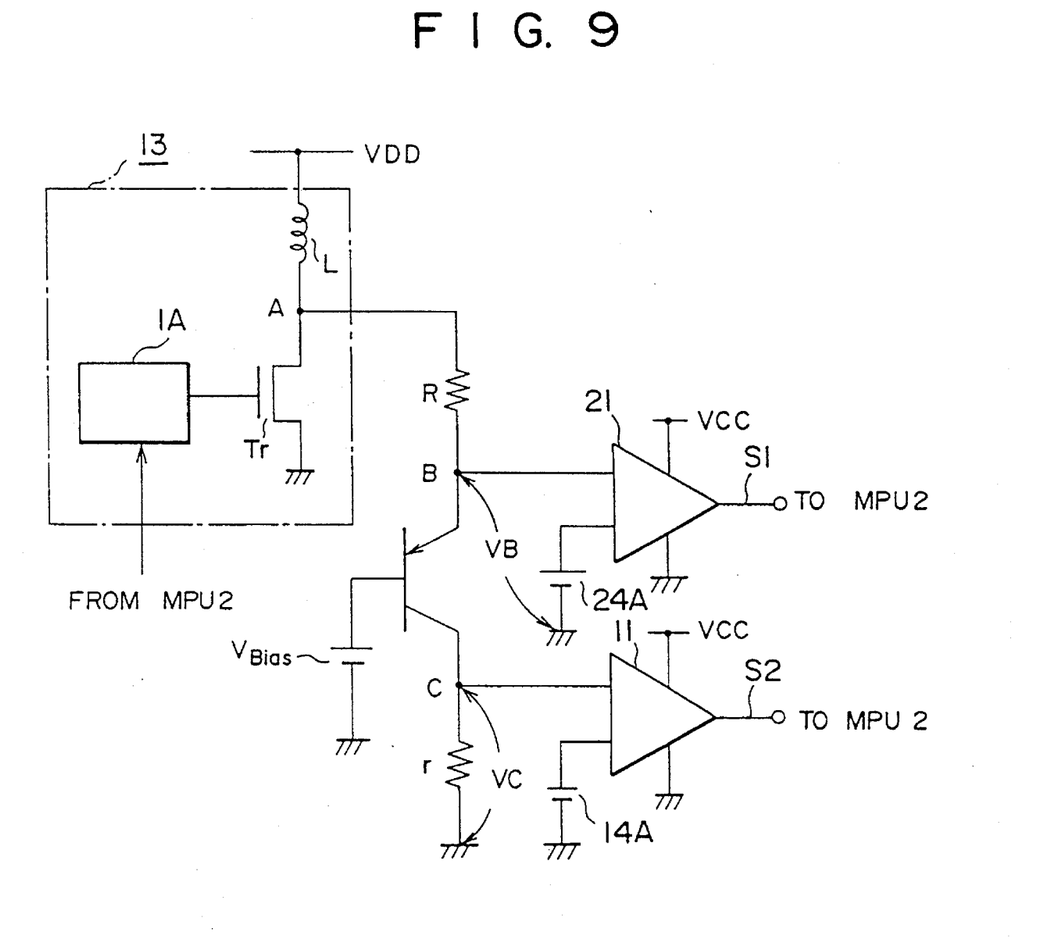
FIG. 9 is a circuit diagram showing the construction of the detection circuit according to a third embodiment of the present invention.

FIG. 9 is a circuit diagram that combines the feature of the circuit of FIG. 7 and the feature of the circuit of FIG. 8.

Referring to FIG. 9, the circuit employs both the comparator 11 and the comparator 21 for detecting the voltage $V_C$ appearing at the node C and the voltage $V_B$ at the node B. Thereby, the comparator 11 is supplied with the voltage $V_C$ and further with the reference voltage from the voltage source $14_A$ for producing an output signal $S_2$ in correspondence to the output signal S. Further, the comparator 21 is supplied with the voltage $V_B$ and further with the reference voltage from the voltage source $24_A$ for producing an output signal $S_1$ in correspondence to the output signal S'. Both the output signals $S_1$ and $S_2$ are supplied to the microcomputer 2. Thereby, the detection circuit of the present embodiment is operational for the entire range of the voltage $V_A$.

Next, a fourth embodiment of the present invention will be described with reference to FIG. 10.

Figure 10:
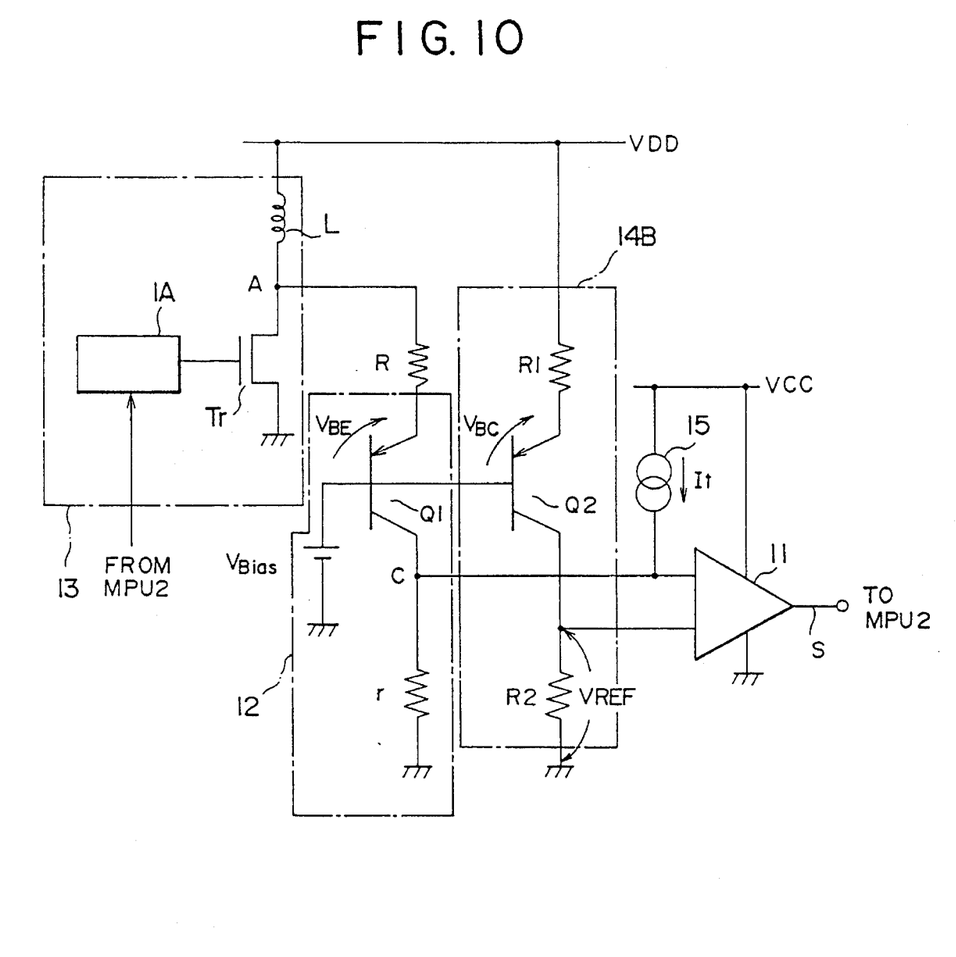
FIG. 10 is a circuit diagram showing the construction of the detection circuit according to a fourth embodiment of the present invention.

Referring to FIG. 10, the detection circuit includes the driver circuit 13, the resistor R, the clamp circuit 12, and the comparator 11, similarly to the first embodiment, wherein there is provided a reference circuit $14_B$ that produces the reference voltage $V_{REF}$ based upon the supply voltage $V_{DD}$.

The reference circuit $14_B$ includes a bipolar transistor $Q_2$ having an emitter that is supplied with the supply voltage $V_{DD}$ via a resistor $R_1$ and a collector that is grounded via a resistor $R_2$. Further, the transistor $Q_2$ has a base that is supplied with the bias voltage $V_{Bias}$ commonly with the transistor $Q_1$. Thereby, the transistor $Q_2$ produces the reference voltage $V_{REF}$ across the resistor $R_2$ in response to the supply voltage $V_{DD}$. As the reference voltage $V_{REF}$ is produced in response to the supply voltage $V_{DD}$, any erroneous operation of the comparator 11 that may occur in the comparators that use a fixed voltage source for the reference voltage $V_{REF}$, is effectively eliminated. The transistor $Q_2$ generally has a common emitter current gain that is substantially identical with the same common emitter current gain $H_{FE}$ of the transistor $Q_1$. Even when there is a variation in the common emitter current gain between the transistor $Q_1$ and the transistor $Q_2$, such a variation tends to be canceled out in the construction of FIG. 10, and the operation of the comparator 11 is stabilized.

In the circuit of FIG. 10, a constant current source 15 powered by the supply voltage $V_{CC}$ is provided for setting the threshold condition that is detected by the comparator 11. Here, the threshold condition means the condition in which the both input voltages to the comparator 11 assume the same voltage level. The constant current source 15 is powered by the supply voltage $V_{CC}$ and supplies a constant current $I_T$ to the node C.

In the circuit of FIG. 10, it should be noted that there holds the following relationship at the threshold condition:

$$[\{V_A-(V_{BE}+V_{Bias})\}/R+I_t]\times r =[\{V_{DD}-(V_{BE}+V_{Bias})\}/R_1]\times R_2.$$

From this equation, one obtains $$V_A=V_{DD}-I_T\times R,$$

where the relationships $R=R_1$ and $r=R_2$ are assumed for the resistors R, $R_1$, r and $R_2$.

The above equation indicates that the voltage level $V_A$ that is lower than the supply voltage $V_{DD}$ by $I_T\times R$ becomes the threshold level that is detected by the comparator 11. It should be noted that the above equation does not contain the term of $V_{REF}$. Thus, the threshold operation of the comparator 11 becomes immune to the variation of the supply voltage $V_{DD}$ even when the reference voltage $V_{REF}$ is produced from the supply voltage $V_{DD}$. It should also be noted that the threshold level $V_A$ becomes equal to the supply voltage $V_{DD}$ when the constant current source 15 is omitted, assuming that the transistors $Q_1$ and $Q_2$ have the same common emitter current gain $H_{FE}$.

Figure 11:
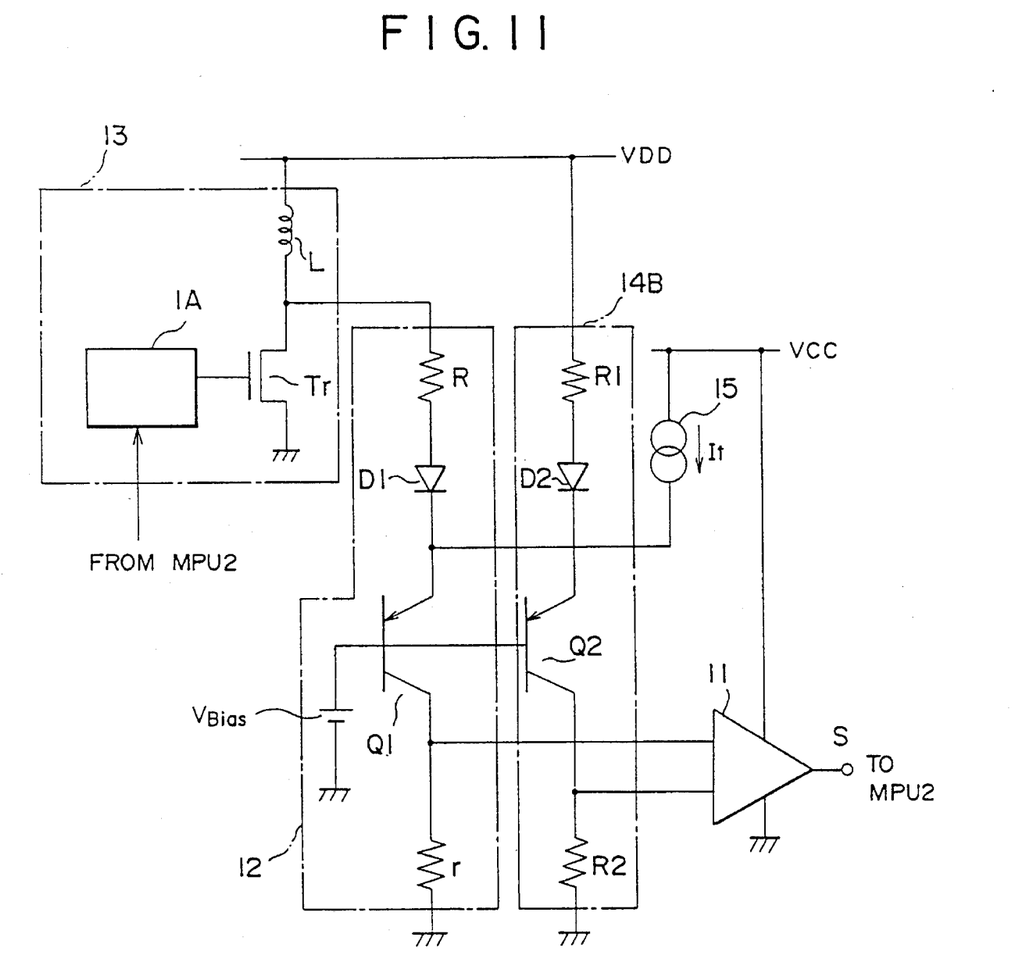
FIG. 11 is a circuit diagram showing the construction of the detection circuit according to a fifth embodiment of the present invention.

FIG. 11 shows a fifth embodiment of the present invention.

The circuit of FIG. 11 has a construction substantially identical with the circuit of FIG. 10 except that the constant current source 15 supplies the current $I_T$ to the emitter of the transistor $Q_1$ and that the circuit 12 includes a diode $D_1$ between the resistor R and the emitter of the transistor $Q_1$ for blocking a reverse flow of the current from the emitter of the transistor $Q_1$ to the solenoid L. Further, another diode $D_2$ is provided in the reference circuit $14_B$ between the resistor $R_1$ and the emitter of the transistor $Q_2$ for compensating a voltage drop cause across the diode $D_1$ in the clamp circuit 12. As a result of the use of the diode $D_1$, the circuit of FIG. 11 provides a stable operation.

Figure 12:
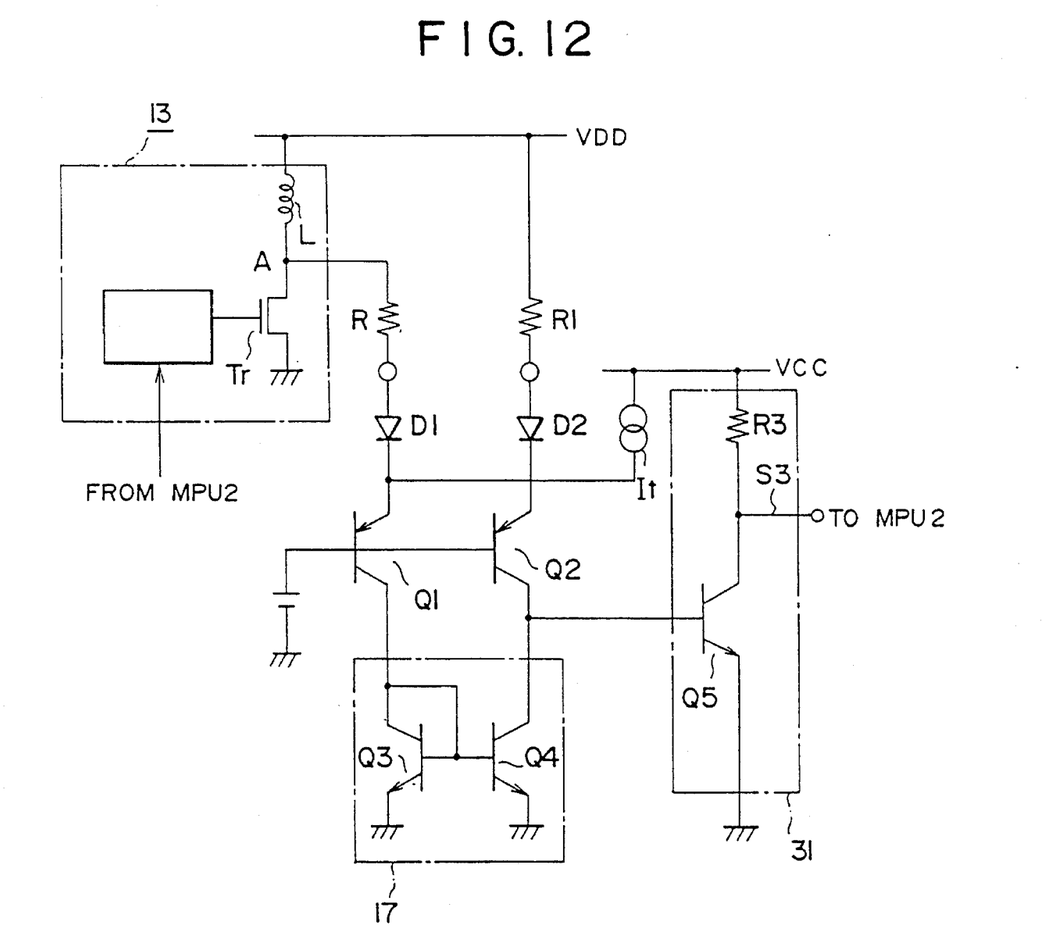
FIG. 12 is a circuit diagram showing the construction of the detection circuit according to a sixth embodiment of the present invention.

FIG. 12 shows a sixth embodiment of the present invention.

Referring to FIG. 12, the circuit is a modification of the circuit of FIG. 11 and includes a current mirror 17 at the collector of the transistors $Q_1$ and $Q_2$. The current mirror 17 includes a first transistor $Q_3$ and a second transistor $Q_4$ having respective bases connected with each other. The base and the collector of the transistor $Q_3$, are connected with each other, and, further, are connected to the collector of the transistor $Q_1$, while the emitter of the transistor $Q_3$ is connected to the ground as usual in the current mirror circuit. Further, the transistor $Q_4$ has a collector connected to the collector of the transistor $Q_2$ and an emitter connected to the ground.

As usual in the current mirror circuit, the current flowing through the transistor $Q_4$ becomes equal to the current flowing through the transistor $Q_3$. In other words, the current flowing through the transistor $Q_4$ represents the current that flows through the resistor R, which in turn reflects the voltage level of the node A. Further, the voltage level at the collector of the transistor $Q_2$ changes in response to the current flowing through the transistor $Q_4$, and the circuit of FIG. 12 detects the state of the solenoid L by detecting the voltage level of the collector of the transistor $Q_2$ by an ordinary amplifier circuit 31 that includes a transistor $Q_5$. There, the transistor $Q_5$ has a collector supplied with the second supply voltage $V_{CC}$ via a resistor $R_3$ and an emitter connected to the ground. Further, the transistor $Q_5$ has a base connected to the collector of the transistor $Q_2$. Thereby, an output signal $S_3$ indicative of the result of detection is obtained at the collector of the transistor $Q_5$. According to the present embodiment, the comparator circuit can be eliminated and the circuit construction can be significantly simplified.

Figure 13:
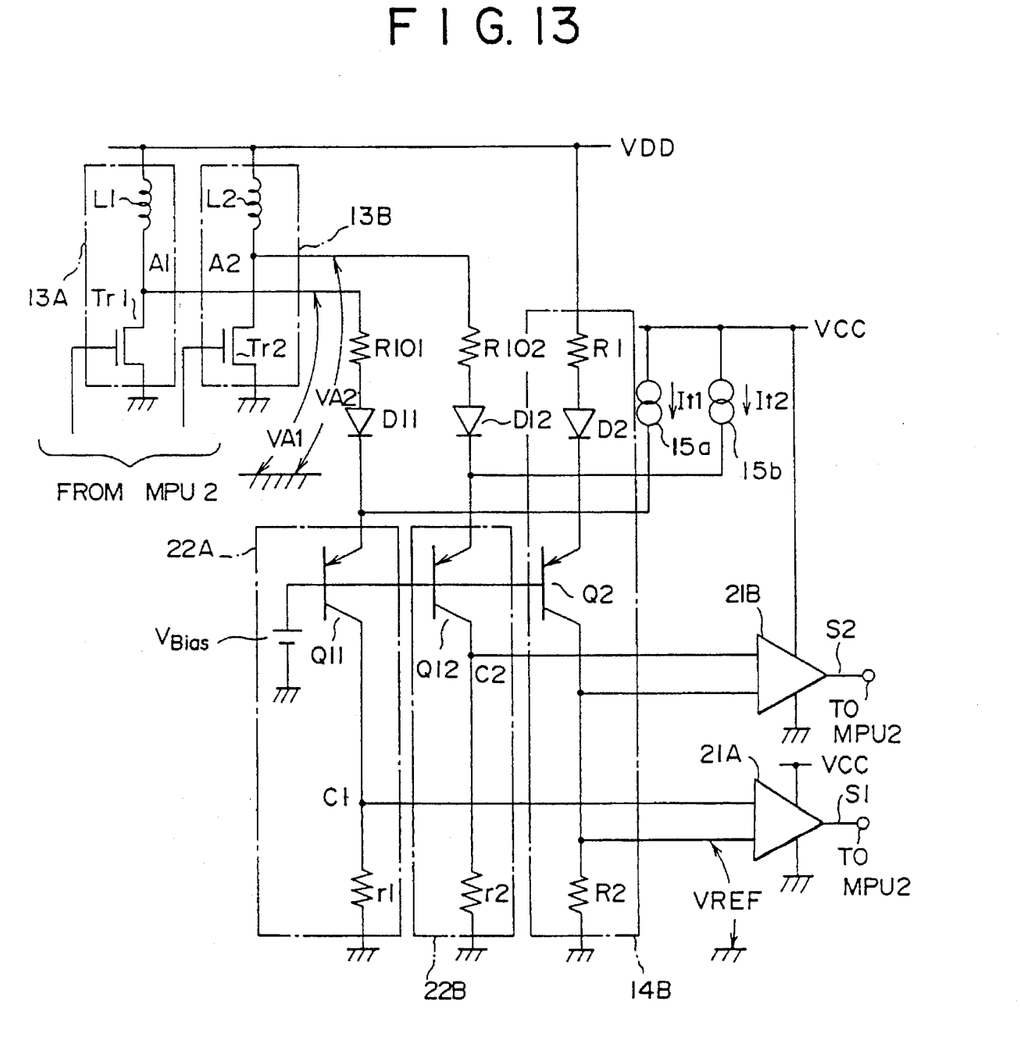
FIG. 13 is a circuit diagram showing the construction of the detection circuit according to a seventh embodiment of the present invention.

FIG. 13 shows a seventh embodiment of the present invention, wherein the embodiment of FIG. 11 is applied for detecting the state of two, different solenoids $L_1$ and $L_2$ that form actuation circuits $13_A$ and $13_B$ respectively. Each of the circuits $13_A$ and $13_B$ has a construction identical with the circuit 13.

There, a first resistor $R_{101}$ is provided in correspondence to the resistor R for converting a voltage appearing at a node $A_1$ in the circuit $13_A$ to a current, and a clamp circuit $22_A$ is provided in correspondence to the clamp circuit 12. There, the clamp circuit $22_A$ includes a transistor $Q_{11}$ corresponding to the transistor $Q_1$ and a resistor $r_1$ corresponding to the resistor r. Further, a diode $D_{11}$ is provided between the resistor $R_{101}$ and the circuit $22_A$ in correspondence to the diode $D_1$. Similarly, there is provided a second resistor $R_{102}$ also in correspondence to the resistor R for converting a voltage appearing at a node $A_2$ of the circuit $13_B$ to a current, and a clamp circuit $22_B$ is provided in correspondence to the clamp circuit 12. The clamp circuit $22_B$, on the other hand, includes a transistor $Q_{12}$ corresponding to the transistor $Q_1$ and a resistor $r_2$ also corresponding to the resistor r. Further, a diode $D_{12}$ is provided between the resistor $R_{102}$ and the circuit $22_B$ in correspondence to the diode $D_1$. As the operation of the circuits $22_A$ and $22_B$ is obvious from the description of the previous embodiments, further description will be omitted. Further, there are provided constant current sources 15a and 15b in correspondence to the constant current source 15. The output voltage produced by the clamp circuits $22_A$ and $22_B$ are supplied to comparators $21_A$ and $21_B$ respectively, wherein the respective comparators $21_A$ and $21_B$ are supplied with the reference voltage $V_{REF}$ from the reference circuit $14_B$ and produce output signals $S_1$ and $S_2$ respectively.

Figure 14:
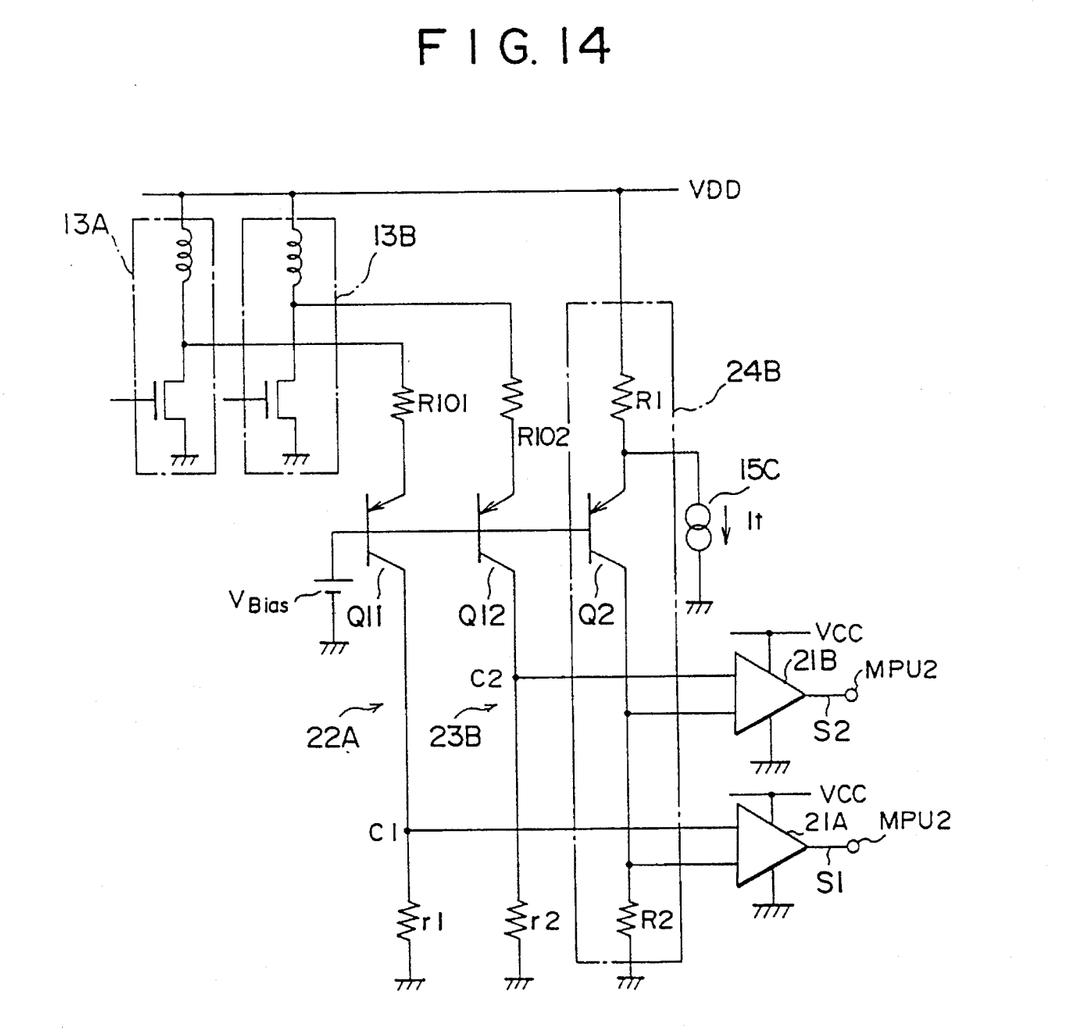
FIG. 14 is a circuit diagram showing the construction of the detection circuit according to an eighth embodiment of the present invention.

FIG. 14 shows an eighth embodiment of the present invention for detecting the state of the respective solenoids in the actuation circuit $13_A$ and the actuation circuit $13_B$. Thereby, the circuit of FIG. 14 operates similarly to the circuit of FIG. 13. In FIG. 14, the parts that are identical with the circuit of FIG. 13 are designated by the same reference numerals.

In the circuit of FIG. 14, it should be noted that the diodes $D_{11}$, $D_{12}$ and $D_2$ are eliminated. Associated therewith, the current sources 15a and 15b are also eliminated. Instead, another current source 15c is provided in connection with the transistor $Q_2$ of the reference circuit $24_B$ for diverting a part of the current that is supplied to the transistor $Q_2$ to the ground. By setting the current $I_T$ suitably, one can set the reference voltage $V_{REF}$ and hence the threshold level of the operation of the comparators $21_A$ and $21_B$. According to the circuit of FIG. 14, one can simplify the circuit construction as compared with the circuit of FIG. 13.

Further, the present invention is not limited to the embodiments described heretofore, but various variations and modifications may be made without departing from the scope of the invention.

What is claimed is:

1. A detection circuit for detecting a state of an object circuit comprising:

voltage-current conversion means, supplied with a first voltage signal indicative of the state of said object circuit, for producing an output current having a magnitude indicative of said state in response to said first voltage signal;

detection means, activated by a supply voltage and supplied with a second voltage signal, for detecting said state of said object circuit in response to said second voltage signal; and clamping means, having an input terminal to which said output current of said voltage-current conversion means is supplied, for clamping a voltage of said input terminal at a predetermined level and producing said second voltage signal in response to said output current, such that said second voltage signal has a magnitude proportional to said first voltage signal and such that said magnitude of said second voltage signal is smaller than said supply voltage, said clamping means supplying said second voltage signal to said detection means, said second voltage comprising the voltage produced across said second resistor, said clamping means comprising:

a first bipolar transistor having an emitter supplied with said output current, a base supplied with a predetermined fixed bias voltage and a collector connected to ground via a second resistor and controlling a current flow through, and corresponding voltage produced across, the second resistor, and;

a bias voltage source which supplies said predetermined, fixed bias voltage to said base of said first bipolar transistor, said detection means comprising:

a comparator circuit supplied with, and comparing, said second voltage signal and a reference voltage signal and producing an output voltage signal as a result of the comparison of said second voltage signal with said reference voltage; and a reference circuit which produces said reference voltage, said reference circuit comprising a second bipolar transistor having an emitter supplied with said supply voltage via a third resistor, a base supplied with said predetermined, fixed bias voltage, and a collector connected to ground via a fourth resistor.

2. A detection circuit as claimed in claim 1, wherein said clamping means further comprises a constant current source which produces a predetermined current, said constant current source supplying said predetermined current such that said predetermined current is added to the current that flows through said second resistor.

3. A detection circuit as claimed in claim 1, wherein said reference circuit comprises a constant current source that diverts a predetermined part of a current that is supplied to said emitter of said second bipolar transistor, via said third resistor, to ground.

4. A detection circuit as claimed in claim 2, wherein said constant current source supplies said predetermined current to said collector of said first bipolar transistor.

5. A detection circuit as claimed in claim 2, wherein said constant current source supplies said predetermined current to said emitter of said first bipolar transistor.

6. A detection circuit as claimed in claim 5, wherein said clamping means further comprises a diode connected between said emitter of said first bipolar transistor and said voltage-current conversion means, said diode blocking a flow of current from said emitter of said first bipolar transistor to said object circuit.

7. A detection circuit as claimed in claim 6, wherein said reference circuit further comprises a second diode connected between said emitter of said second bipolar transistor and second third resistor, said second diode blocking a flow of current from said second bipolar transistor to said third resistor.

8. A detection circuit for detecting a state of an object circuit comprising:

voltage-current conversion means, supplied with a first voltage signal indicative of the state of said object circuit, for producing an output current having a magnitude indicative of said state in response to said first voltage signal;

detection means, activated by a supply voltage and supplied with a second voltage signal, for detecting said state of said object circuit in response to said second voltage signal, said object circuit being activated by a further supply voltage; and clamping means, having an input terminal to which said output current of said voltage-current conversion means is supplied, for clamping a voltage of said input terminal at a predetermined level and producing said second voltage signal in response to said output current, such that said second voltage signal has a magnitude proportional to said first voltage signal and such that said magnitude of said second voltage signal is smaller than said supply voltage, said clamping means supplying said second voltage signal to said detection means, said clamping means comprising:

a first bipolar transistor having an emitter supplied with said output current, a base supplied with a predetermined, fixed bias voltage and a collector;

a second bipolar transistor having an emitter supplied with the further supply voltage that activates said object circuit, a base connected commonly with the base of said first bipolar transistor, and a collector;

a current mirror circuit connected to said collector of said first bipolar transistor and further to said collector of said second bipolar transistor and operative for causing a common collector current to flow through said first and second bipolar transistors; and a constant current source which supplies a predetermined current to said first bipolar transistor.

9. A detection circuit for detecting a state of an object circuit comprising:

voltage-current conversion means, supplied with a first voltage signal indicative of the state of said object circuit, for producing an output current having a magnitude indicative of said state in response to said first voltage signal;

detection means, activated by a supply voltage and supplied with a second voltage signal, for detecting said state of said object circuit in response to said second voltage signal; and clamping means, having an input terminal to which said output current of said voltage-current conversion means is supplied, for clamping a voltage of said input terminal at a predetermined level and producing said second voltage signal in response to said output current, such that said second voltage signal has a magnitude proportional to said first voltage signal and such that said magnitude of said second voltage signal is smaller than said supply voltage, said clamping means supplying said second voltage signal to said detection means, said object circuit comprising a plurality of circuit members producing a corresponding plurality of first voltage output signals, said first voltage signal comprising said corresponding plurality of first voltage output signals and each first voltage output signal indicating the state of said corresponding circuit member, said voltage-current conversion means comprising a plurality of resistors corresponding to said plurality of circuit members, each resistor being supplied with said first voltage output signal of said corresponding circuit member and converting the same to, and producing as an output thereof, a corresponding resistor output current, said plurality of corresponding resistor output currents, of said plurality of resistors, comprising said output current of said voltage-current conversion means, said clamping means comprising a plurality of clamping circuits corresponding to said plurality of resistors, each clamping circuit including a bipolar transistor having an emitter to which said resistor output current of said corresponding resistor is supplied, a base biased at a predetermined fixed base bias voltage that is set in common for said plurality of clamping circuits, and a collector connected to ground via a respective collector resistor, each of said clamping circuits producing a corresponding clamping circuit output voltage across said respective collector resistor, said second voltage signal produced by said clamping means comprising said plurality of clamping circuit output voltages of said corresponding plurality of clamping circuits, and said detection means comprising a plurality of comparator circuits corresponding to said plurality of clamping circuits, each of said comparator circuits being supplied with, and comparing, said clamping circuit output voltage from said corresponding clamping circuit and said reference voltage signal, said reference voltage signal being supplied in common to said plurality of clamping circuits, said second voltage signal produced by said clamping means comprising the plurality of clamping circuit output voltages of said corresponding plurality of clamping circuits.

* * * * *

UNITED STATES PATENT AND TRADEMARK OFFICE
CERTIFICATE OF CORRECTION

PATENT NO. : 5,488,324
DATED : Jan. 30, 1996
INVENTOR(S) : MIZUTA et al.

It is certified that error appears in the above-indentified patent and that said Letters Patent is hereby corrected as shown below:

Col. 1, line 51, change "(MPV)" to --(MPU)--.

Col. 3, line 33, after "systems" insert --,--.

Signed and Sealed this

Ninth Day of July, 1996

Attest:

BRUCE LEHMAN

*Attesting Officer*     *Commissioner of Patents and Trademarks*